(12) United States Patent
Pfister

(10) Patent No.: US 6,378,816 B1
(45) Date of Patent: Apr. 30, 2002

(54) LINEAR MOTION TABLE LEG

(76) Inventor: Joel W. Pfister, 4967 Kensington Gate, Shorewood, MN (US) 55331

( * ) Notice: Subject to any disclaimer, the term of this patent is extended or adjusted under 35 U.S.C. 154(b) by 0 days.

(21) Appl. No.: 09/521,321

(22) Filed: Mar. 9, 2000

Related U.S. Application Data

(63) Continuation-in-part of application No. 09/326,281, filed on Jun. 4, 1999, now Pat. No. 6,189,843.

(51) Int. Cl.[7] .............................................. F16M 11/00
(52) U.S. Cl. ..................... 248/161; 248/157; 248/188.5
(58) Field of Search .............................. 384/49, 50, 51, 384/52, 53, 54, 56, 57; 248/125.1, 161, 157, 188.5, 188.1, 188.2, 295.1, 298.1, 132, 430; 297/344.18, 423.1; 108/144.1, 147.19; 403/104

(56) References Cited

U.S. PATENT DOCUMENTS

| | | | | |
|---|---|---|---|---|
| 3,285,207 A | * | 11/1966 | Hagen | 248/161 X |
| 3,887,155 A | * | 6/1975 | Bertalot | 248/188.5 |
| 3,971,599 A | * | 7/1976 | Shio | 384/54 |
| 4,183,689 A | * | 1/1980 | Wirges | 248/161 |
| 4,842,238 A | * | 6/1989 | Toiyama | 248/161 X |
| 6,189,843 B1 | * | 2/2001 | Pfister | 248/161 |
| 6,247,847 B1 | * | 6/2001 | Lob | 384/51 |

* cited by examiner

Primary Examiner—Kimberly T. Wood
Assistant Examiner—Gwendolyn Baxter
(74) Attorney, Agent, or Firm—Hugh D. Jaeger

(57) ABSTRACT

Linear motion table leg whereby a linear motion assembly is located between a base and a table top mounting plate. Arrays of rollers, some of which are spring loaded, are spaced at 120° and disposed between a configured inner tube and an outer tube to provide for rollable interfacing between the configured inner tube and the outer tube. A gas spring is centrally located to provide for linear positioning and for locking of the configured inner tube with respect to the outer tube. An alternate embodiment features a ball bearing array disposed between opposing races of the configured inner tube and outer tube to reference the configured inner tube to the outer tube.

37 Claims, 15 Drawing Sheets

LINEAR MOTION TABLE LEG

CROSS REFERENCES TO CO-PENDING APPLICATIONS

This patent application is a continuation-in-part of Ser. No. 09/326,281 entitled "Linear Motion Table Leg" filed on Jun. 4, 1999, now U.S. Pat. No. 6,189,843.

BACKGROUND OF THE INVENTION

1. Field of the Invention

The present invention pertains to a table leg, and more particularly relates to a table leg incorporating a linear motion assembly which allows adjustability of the height of a table top supported by the table leg.

2. Description of the Prior Art

None.

SUMMARY OF THE INVENTION

The general purpose of the present invention is to provide a linear motion table leg which is adjustable through a vertical range. A linear motion assembly aligns between a base and a mounting plate to which a table top can be suitably secured. The linear motion assembly includes a configured inner tube adjustably aligned substantially concentrically within an outer tube. Arrays of rollers contained in race cages interface between arced surfaces located on the configured inner tube and the inner circumference of the outer tube at 120° to provide for rollered triangulated-like coupling of the configured inner tube and the outer tube. One such array of rollers includes split roller assemblies having opposing roller segments which are spring loaded outwardly in opposition to ultimately force the remaining arrays of rollers against the inner circumference of the outer tube to provide contact of tangential nature as well as providing for additional tangential contact between the arrayed rollers and the configured inner tube. A gas spring and an associated actuation assembly provide for vertical positioning of the configured inner tube with respect to the fixed outer tube to adjust the height of an attached table top.

According to a preferred embodiment of the present invention there is provided a linear motion table leg having a linear motion assembly located between a base and a table top mounting plate. An outer tube, a configured inner tube, arrays of rollers, a gas spring, a gas spring actuation assembly, a pivot mount and other components comprise the linear motion assembly.

According to an alternative embodiment there is provided a linear motion table leg featuring interfacing and reference maintained between an outer tube and a configured inner tube to prevent rotation about a vertical axis of the configured inner tube within the outer tube. The outer tube includes a bearing race vertically disposed along one interior surface thereof and the configured inner tube includes a correspondingly located bearing race disposed vertically along one exterior surface. A ball bearing array aligns as an interface between the vertically disposed race along the interior surface of the outer tube and the vertically disposed race on the exterior of the configured inner tube. The ball bearing array includes a plurality of ball bearings which are suitably captured by the aligned and opposing bearing races to reference and to prevent rotational displacement between the outer tube and the configured inner tube.

One significant aspect and feature of the present invention is a linear motion table leg having a linear motion assembly.

Another significant aspect and feature of the present invention is a linear motion assembly having arrays of rollers interfacing between a configured inner tube and an outer tube which align and guide the configured inner tube within the outer tube.

Another significant aspect and feature of the present invention is tangential contact of one or more roller arrays with the inner circumference of the outer tube and tangential contact with arced surfaces of a configured inner tube.

Another significant aspect and feature of the present invention is the inclusion of rollers which are split and forced outwardly from each other along and about an axis.

Another significant aspect and feature of the present invention is the inclusion of rollers which are forced by spring action of an array of spring loaded rollers against the inner circumference of the outer tube.

Another significant aspect and feature of the present invention is the triangulated orientation of an array of spring loaded rollers in concert with two arrays of solid rollers.

Another significant aspect and feature of the present invention is the use of spring loaded rollers and solid rollers which automatically self-align between an outer tube and a configured inner tube to provide sufficient and stable interfacing therebetween.

Another significant aspect and feature of the present invention, as shown in an alternative embodiment, is a ball bearing array disposed between opposing bearing races located on the outer tube and the inner tube to reference and to prevent rotational movement of the configured inner tube and the outer tube with respect to each other.

Having thus described embodiments of the present invention, it is the primary objective hereof to provide a linear motion table leg.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
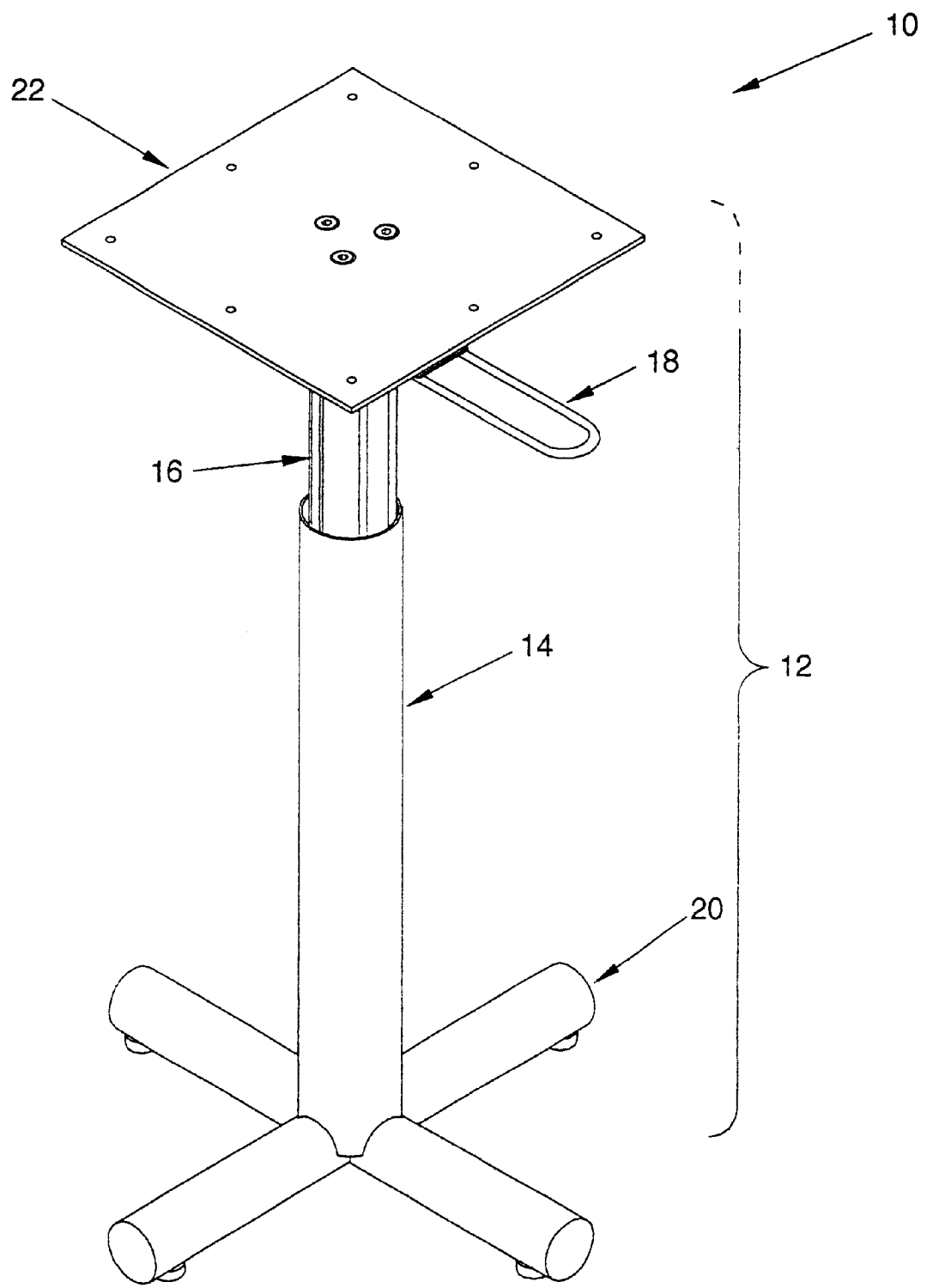
FIG. 1 illustrates an isometric view of a linear motion table leg, the present invention.

FIG. 1 illustrates an isometric view of a linear motion table leg 10, the present invention. Partially visible or fully visible components in the illustration include a vertically oriented linear motion assembly 12, components of the vertically oriented linear motion assembly 12 including an outer tube 14, a configured inner tube 16 and an actuation assembly 18; a base 20 which supports the vertically oriented linear motion assembly 12, and a mounting plate 22 secured to the top of the vertically oriented linear motion assembly 12. The configured inner tube 16 aligns in and is substantially co-centered with the outer tube 14. Actuation of the actuation assembly 18 controls the operation of an internally located gas spring 24 of FIG. 2 to allow vertical positioning of the configured inner tube 16 with respect to the outer tube 14.

Figure 2:
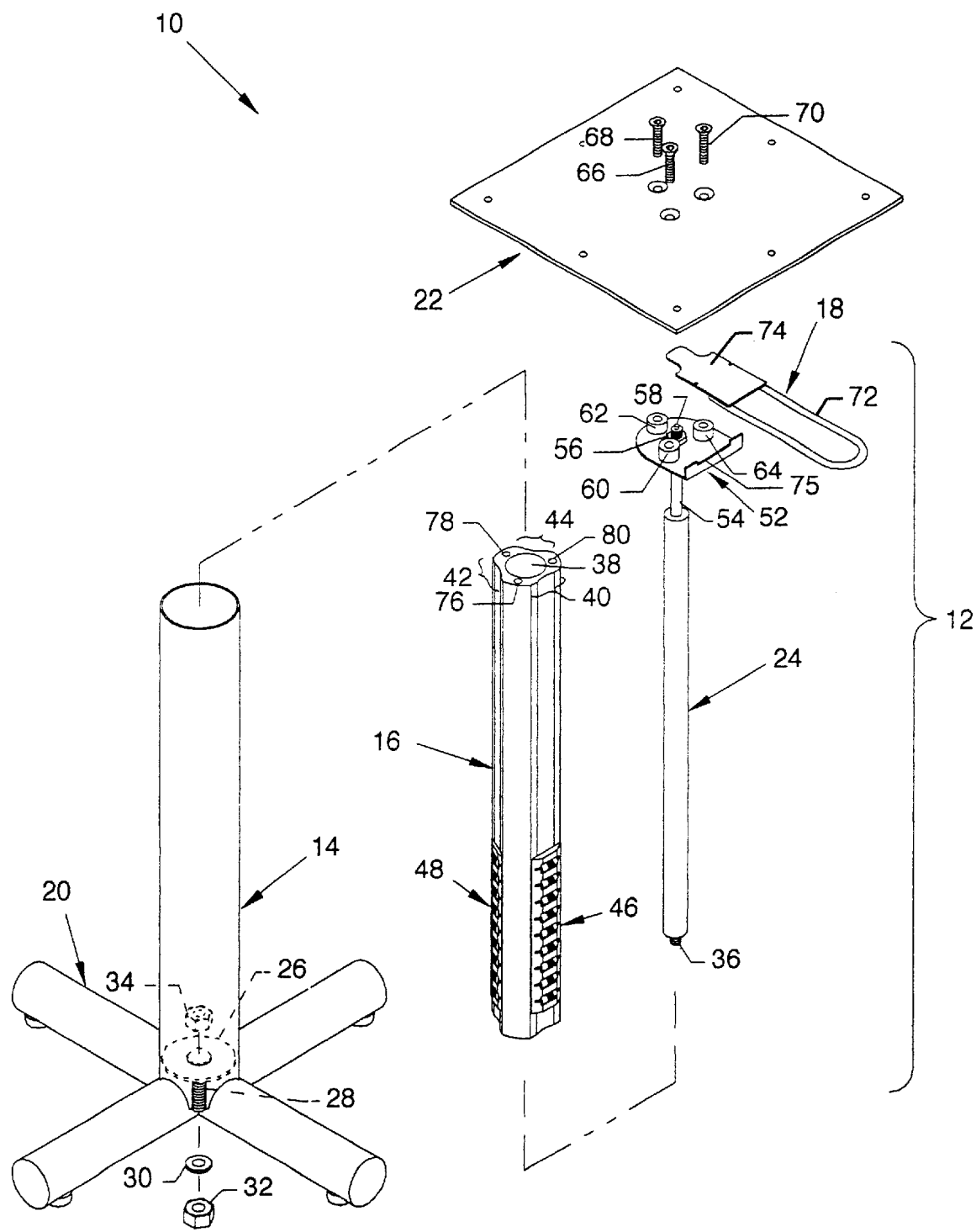
FIG. 2 illustrates an exploded isometric view of the linear motion table leg.

FIG. 2 illustrates an exploded isometric view of the linear motion table leg 10, where all numerals mentioned before correspond to those elements previously described. A round mounting plate 26 secures, such as by welding, to the lower interior of the outer tube 14. A bolt 28 passes through the round mounting plate 26 and is incorporated along with a washer 30 and a nut 32 to secure the outer tube 14 to the base 20. Another nut 34 is secured, such as by welding, to the top of the bolt 28 to serve as an anchoring fixture for the threaded shaft 36 at the lower end of the gas spring 24. Any other suitable means may be incorporated to secure the gas spring 24 to the base 20, and the use of a welded nut anchoring fixture shall not be considered to be limiting to the scope of the invention.

The configured inner tube 16 is of heavy wall construction and includes a centrally located bore 38 extending along its vertical axis to accommodate the gas spring 24. Tracks 40, 42 and 44, which are described later in detail, are located in vertical orientation at 120° intervals along and about the periphery of the configured inner tube 16. A race cage 46 having an array of spring loaded rollers aligns to the track 40 and a similarly constructed race cage 48 aligns to the track 42. Race cage 50, shown in FIG. 4, aligns in a similar fashion to the track 44.

The gas spring 24 has a pivot mounting plate 52 secured to the top of the gas spring operator rod 54 by a nut 56. An operating valve pin 58, which is co-located with the operator rod 54, extends vertically from the top of the operator rod 54. Standoffs 60, 62 and 64 are located at the top of the pivot mounting plate 52 to accommodate screws 66, 68 and 70 which secure through the mounting plate 22 and through the pivot mounting plate 52 to secure the mounting plate 22 and the pivot mounting plate 52 to the top of the configured inner tube 16 via threaded holes 76, 78 and 80, respectively, located at the top of the configured inner tube 16. The actuation assembly 18 includes a handle 72 and a connected pivot plate 74. The pivot plate 74 aligns to and pivots about a cutout 75 on the pivot mounting plate 52 to actuate the operating valve pin 58 to allow vertical positioning of the gas spring 24 and the attached configured inner tube 16.

Figure 3:
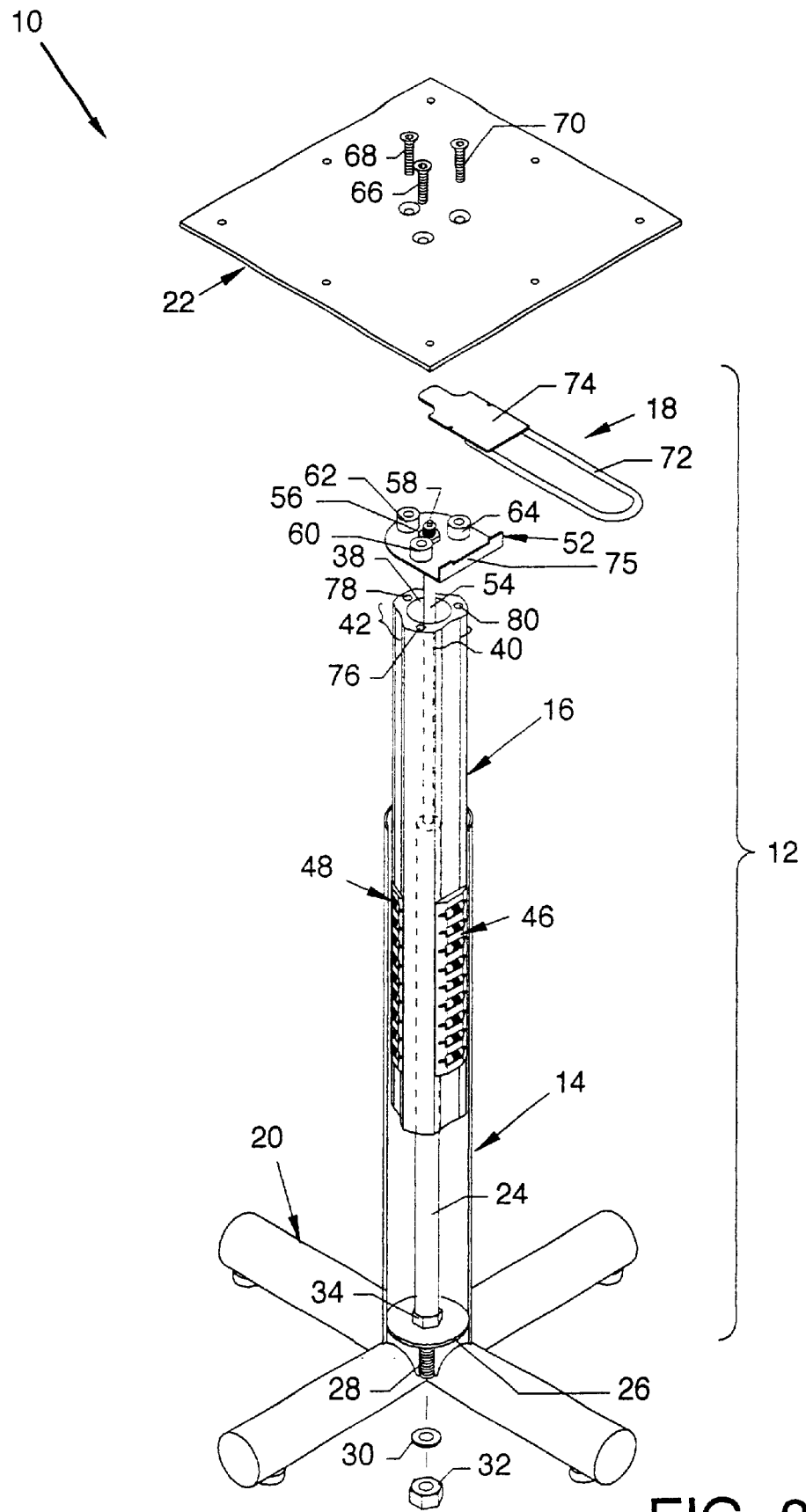
FIG. 3 illustrates a partially assembled isometric cutaway view of the linear motion table leg being in the partially extended position.

FIG. 3 illustrates a partially assembled isometric cutaway view of the linear motion table leg 10 being in the partially extended position, where all numerals mentioned before correspond to those elements previously described. Illustrated in particular is the relationship of the configured inner tube 16 to the outer tube 14. The pivot mounting plate 52 is shown slightly above the top of the configured inner tube 16 for brevity and for the sake of clarity of illustration. The configured inner tube 16 containing the gas spring 24 aligns in concentric fashion within the outer tube 14. The race cages 46, 48 and 50 (not illustrated in this figure) and roller components yet to be described provide triangular-like interfacing at 120° intervals between the outer tube 14 and the configured inner tube 16 to provide for positionable and rollerable coupling along broad and lengthy spans of the outer tube 14 and the configured inner tube 16.

Figure 4:
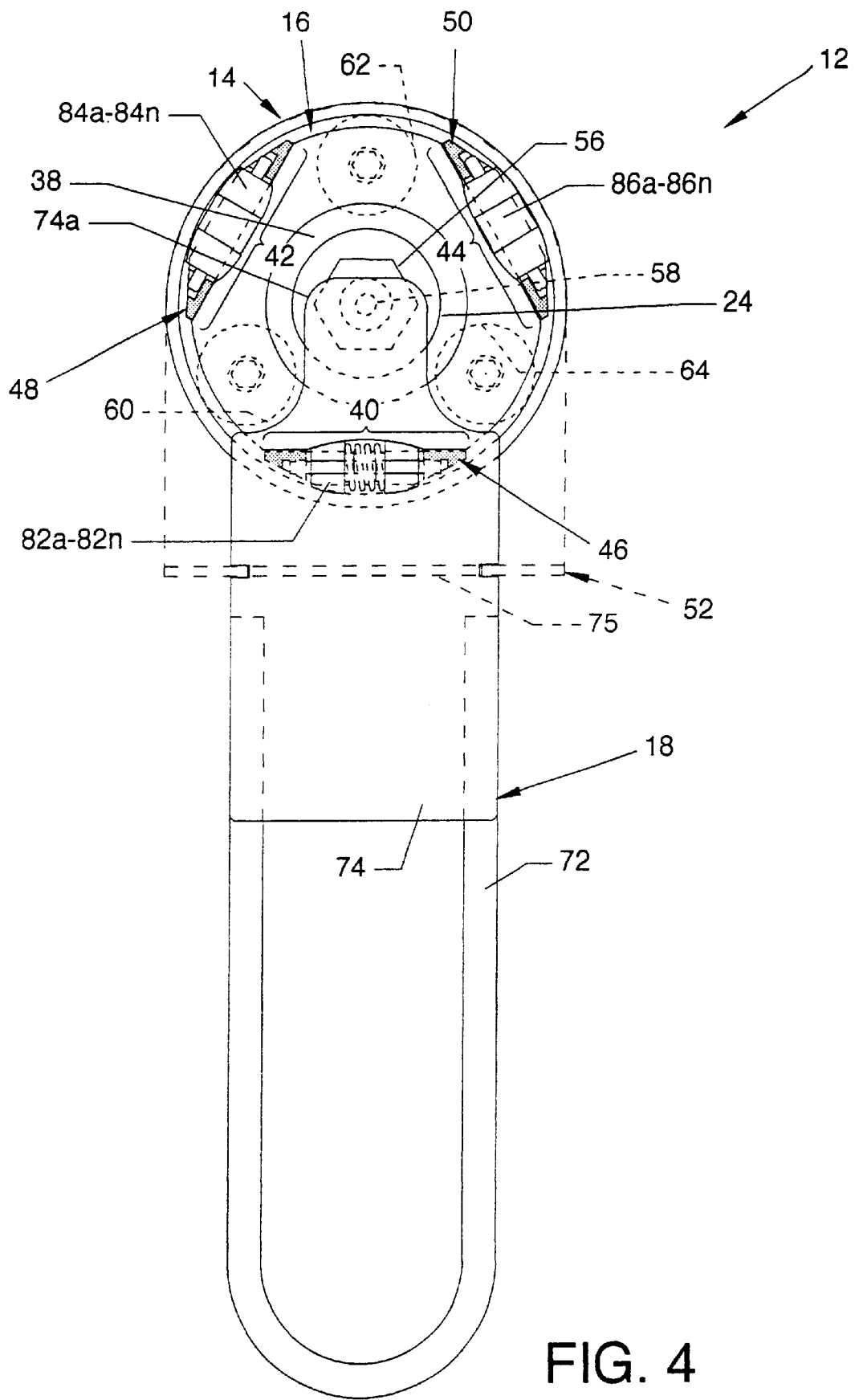
FIG. 4 illustrates a top view of the linear motion assembly.

FIG. 4 illustrates a top view of the linear motion assembly 12, where all numerals mentioned before correspond to those elements previously described. The race cages 46, 48 and 50 each contains an array of roller components including a plurality of variable geometry spring loaded rollers 82a–82n housed and contained by race cage 46, a plurality of solid rollers 84a–84n each of one-piece construction housed and contained by race cage 48, and a plurality of solid rollers 86a–86n each also of one-piece construction housed and contained by race cage 50. Surfaces of the plurality of spring loaded rollers 82a–82n, the plurality of solid rollers 84a–84n and the plurality of solid rollers 86a–86n are in intimate contact with and in engagement with both the inner circumference of the outer tube 14 and portions of the tracks 40, 42 and 44, the shape of which is later described in detail. Also illustrated is the alignment of a tab 74a of the pivot plate 74 with the operating pin valve 58 of the gas spring 24.

Figure 5:
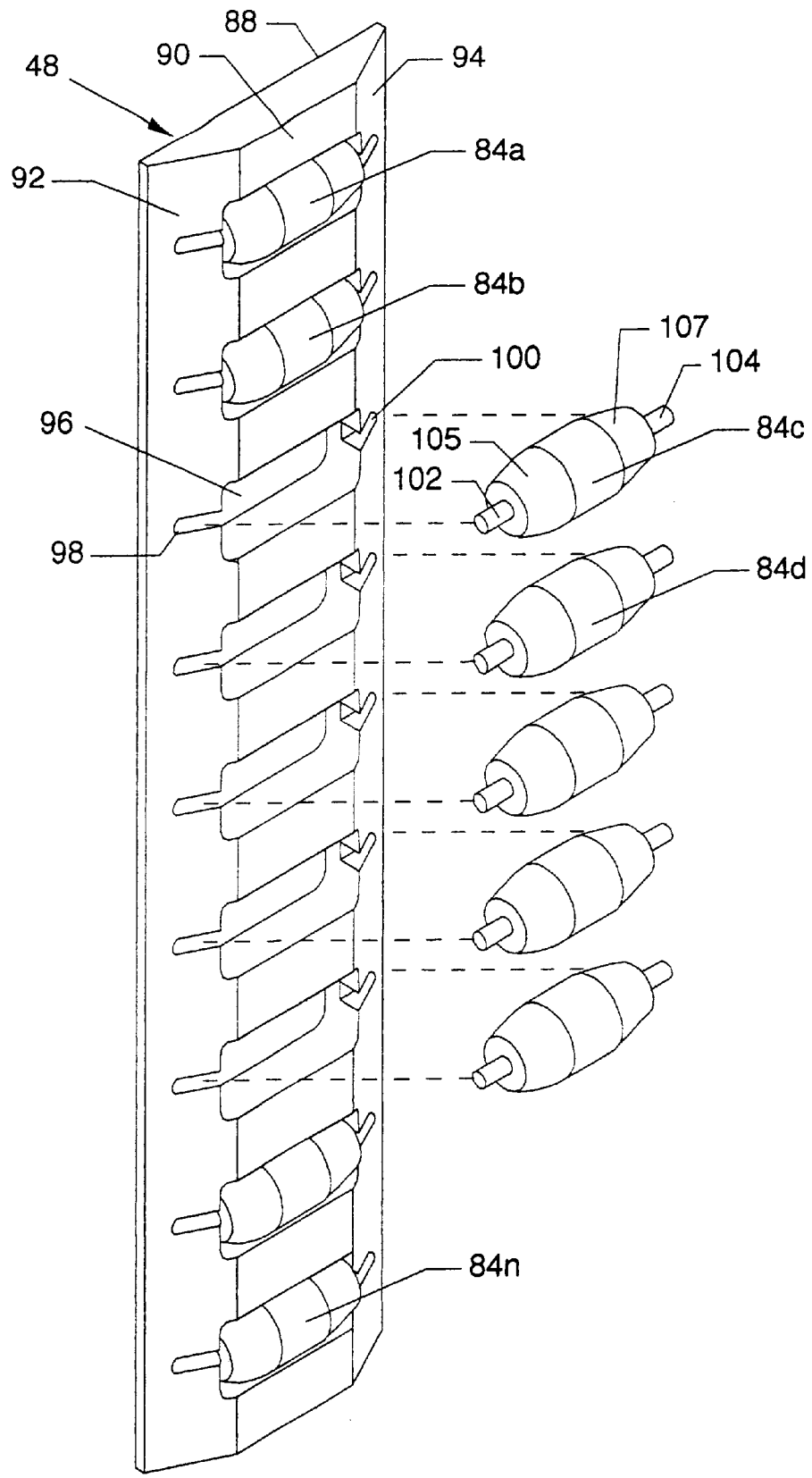
FIG. 5 illustrates an isometric view of a race cage having solid rollers.

FIG. 5 illustrates an isometric view of the race cage 48, being similar in all respects and in description to race cages 46 and 50, where all numerals mentioned before correspond to those elements previously described. The race cage 48 includes a rear surface 88, a front surface 90 and chamfered surfaces 92 and 94 extending substantially between the rear surface 88 and the front surface 90. The race cage 48 includes a plurality of open cavities 96 extending horizontally across the body of the race cage 48 between the chamfered surfaces 92 and 94 and between the rear surface 88 and the front surface 90. Horizontally opposed grooves 98 and 100 extend from the chamfered surfaces 92 and 94 opening into the cavity 96 to accommodate the axles 102 and 104 of the solid rollers 84a–84n. Located inwardly from the axles 102 and 104 are tapered and arced surfaces 105 and 107. One-piece solid rollers 86a–86n, being similar in all respects and in description to the one-piece solid rollers 84a–84n, align and fit into the race cage 50 shown in FIG. 4.

Figure 6:
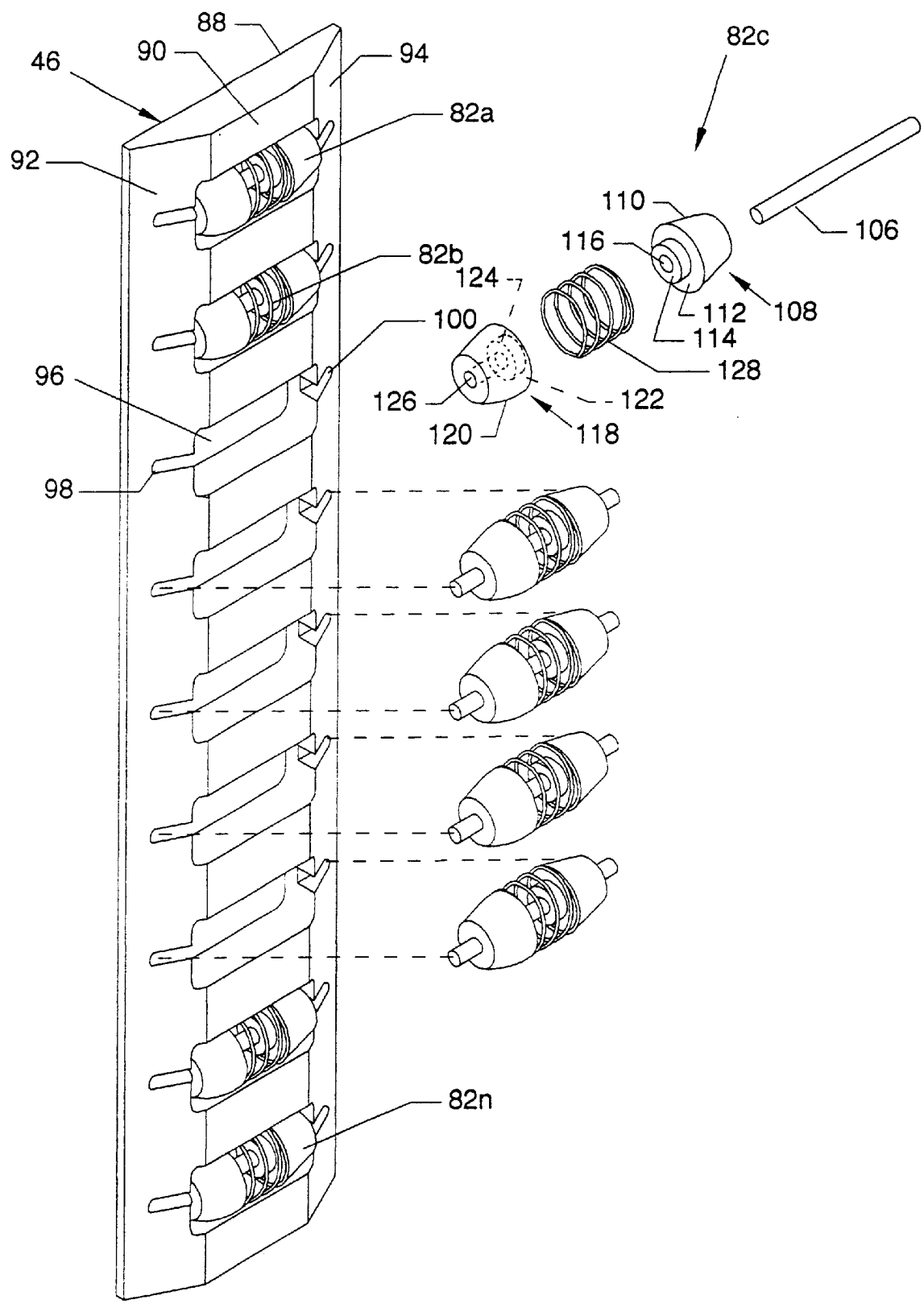
FIG. 6 illustrates an isometric view of a race cage having spring loaded rollers.

FIG. 6 illustrates an isometric view of the race cage 46, being similar in all respects and in description to race cages 48 and 50, where all numerals mentioned before correspond to those elements previously described. Spring loaded rollers 82a–82n, being similar in some and most respects to the one-piece solid rollers 84a–84n and 86a–86n, align and fit into the race cage 46, as also shown in FIG. 4. Spring loaded rollers 82a–82n have a profile closely resembling that of the one-piece solid rollers 84a–84n and 86a–86n. Spring roller 82c of the set of similar geometrically configured spring loaded rollers 82a–82n is now described. Spring roller 82c, shown in exploded view, is assembled about an axle 106 the length of which is suitable for placement and partial capture by the grooves 98 and 100 of the race cage 46. A right roller segment 108 includes a tapered and arced surface 110 having a specified radius, as later described in detail, an annular planar surface 112 located inwardly from the tapered and arced surface 110, an annular shoulder 114 extending inwardly from the annular planar surface 112, and a centrally located bore 116. A similarly shaped left roller segment 118 includes a tapered and arced surface 120 having a specified radius, as later described in detail, an annular planar surface 122 located inwardly from the tapered and arced surface 120, an annular shoulder 124 extending inwardly from the annular planar surface 122, and a centrally located bore 126. A spring 128 aligns concentric to axle 106 between the right roller segment 108 and the left roller segment 118. The bores 116 and 126 of the right roller segment 108 and the left roller segment 118, respectively, align over and about the axle 106. The ends of the spring 128 are supported by and between the annular shoulders 114 and 124 and abut the annular planar surfaces 112 and 122 of the right roller segment 108 and the left roller segment 118, respectively. Spring 128 is appropriately sized and of sufficient strength to exert pressure to force the right roller segment 108 and the left roller segment 118 outwardly and along the axis described by the axle 106.

Figure 7:
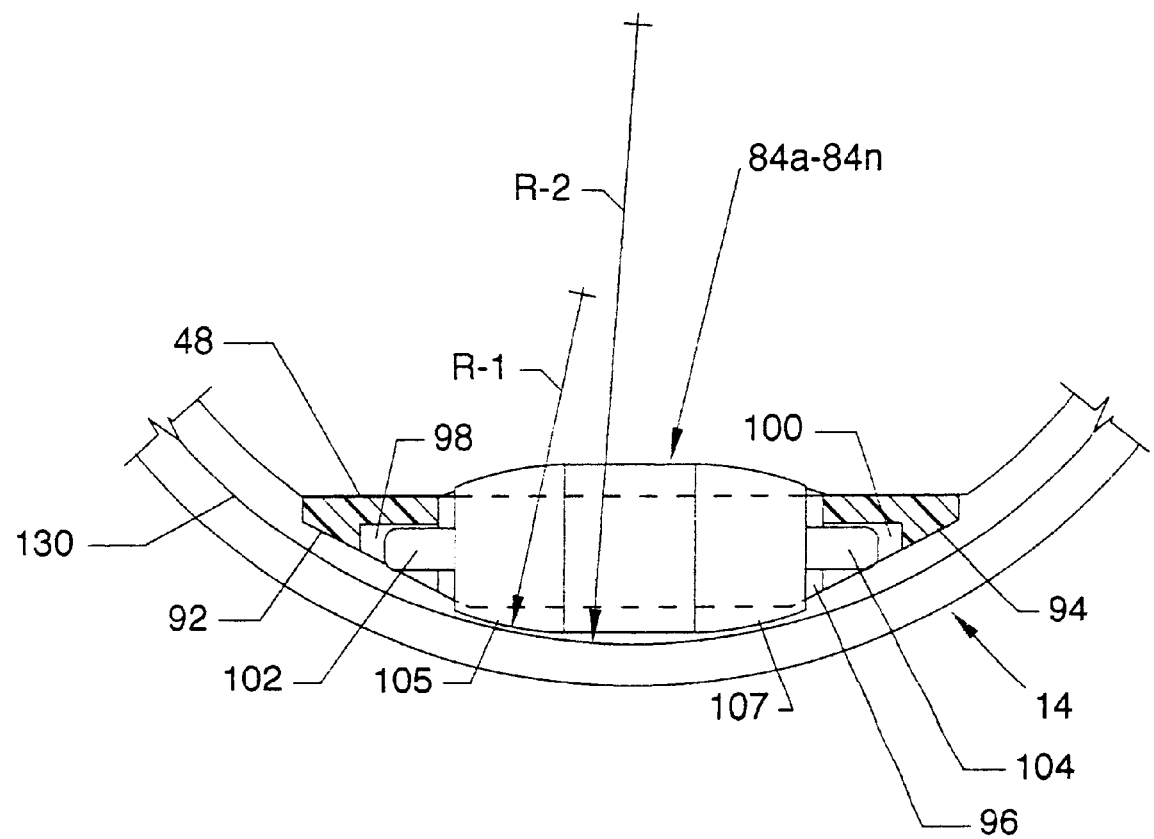
FIG. 7 illustrates a top section view of the race cage and the plurality of solid rollers.

FIG. 7 illustrates a top section view of the race cage 48 and the plurality of solid rollers 84a–84n, shown slightly offset upwardly for purposes of illustration, engaging the inner circumference 130 of the outer tube 14, where all numerals mentioned before correspond to those elements previously described. The plurality of solid rollers 84a–84n extend outwardly beyond the cavities 96 of the race cage 48 to tangentially contact the inner circumference 130 of the outer tube 14. The tapered and arced surfaces 105 and 107 are each fashioned to include a radius R-1 where the radius R-1 is smaller than the radius R-2 of the inner surface of the outer tube 14 to provide tangential and rolling contact at and between the tapered and arced surfaces 105 and 107 and the inner circumference 130 of the outer tube 14. The race cage 50 and the plurality of solid rollers 86a–86n align in a similar fashion.

Figure 8:
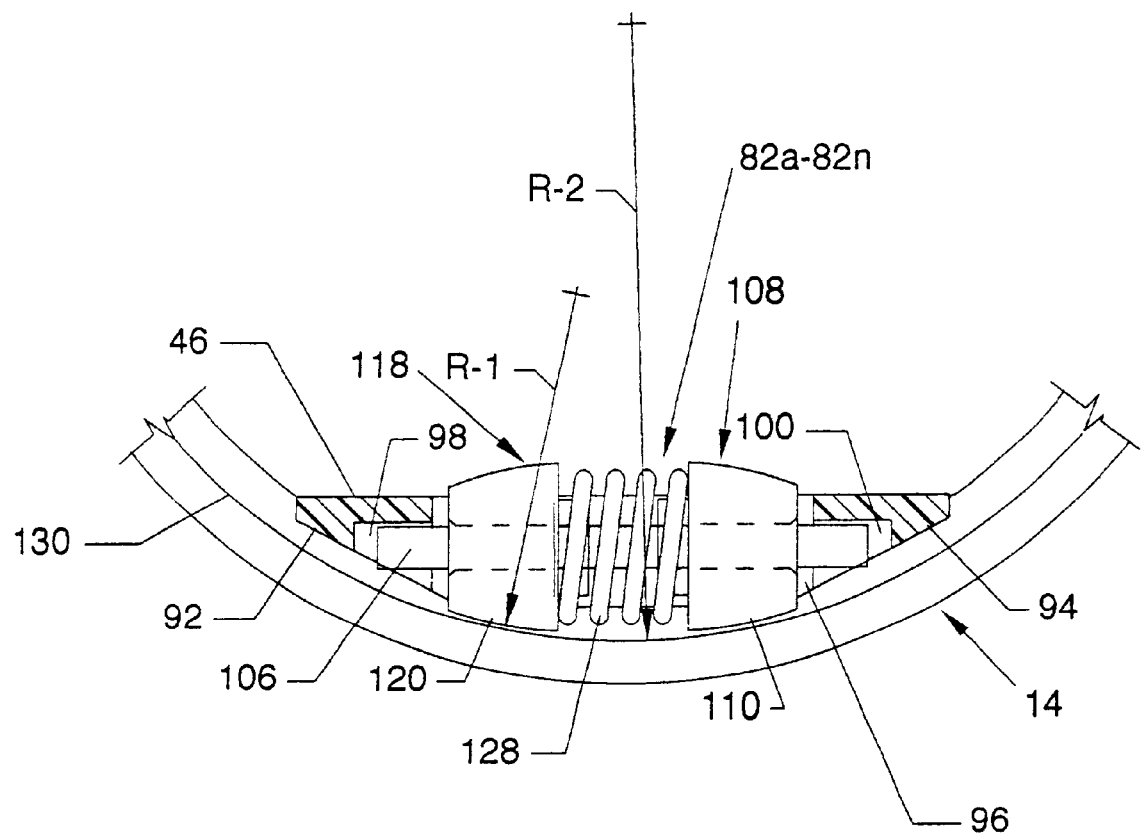
FIG. 8 illustrates a top section view of the race cage and the plurality of spring rollers.

FIG. 8 illustrates a top section view of the race cage 46 and the plurality of spring loaded rollers 82a–82n, shown slightly offset upwardly for purposes of illustration, engaging the inner circumference 130 of the outer tube 14, where all numerals mentioned before correspond to those elements previously described. The plurality of spring loaded rollers 82a–82n aligns substantially in the same manner as prescribed for the solid rollers 84a–84n as described in relation to FIG. 7. The plurality of spring loaded rollers 82a–82n extends outwardly beyond the cavities 96 of the race cage 46 to tangentially contact the inner circumference 130 of the outer tube 14. The tapered and arced surfaces 110 and 120 are fashioned to include a radius R-1, the same radius as found in FIG. 7, where the radius R-1 is smaller than the radius R-2, the same radius R-2 found in FIG. 7, of the inner surface of the outer tube 14 to provide tangential and rolling contact at and between the tapered and arced surfaces 110 and 120 and the inner circumference 130 of the outer tube 14. Tangential contacting prevents and minimizes the possibility of gouging and roller edge induced wear or scored lines on contacting surfaces. The difference of radius R-1 and R-2 in tangential contact allows proper fit and function of the linear motion assembly 12 when the configured inner tube 16 and the outer tube 14 vary in tolerance without the requirement for more expensive precision machined components.

Figure 9:
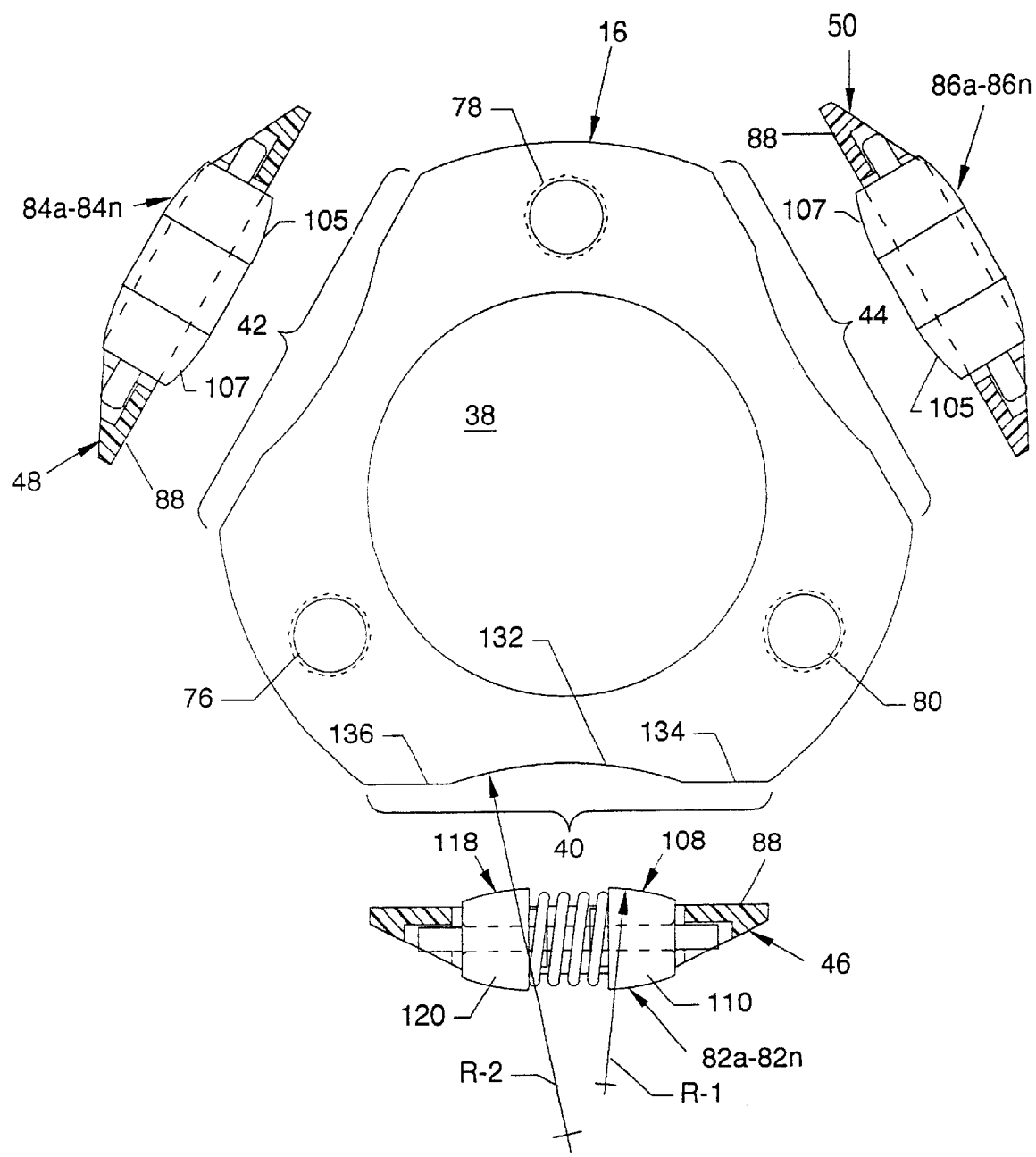
FIG. 9 illustrates a top view in partial cross section of the race cages containing pluralities of spring rollers and solid rollers shown offset from a configured inner tube.

FIG. 9 illustrates a top view in partial cross section of the race cages 46, 48 and 50 correspondingly containing pluralities of spring loaded rollers 82a–82n and solid rollers 84a–84n and 86a–86n shown offset from the configured inner tube 16 for purposes of illustration, where all numerals mentioned before correspond to those elements previously described. Tracks 40, 42 and 44 are similarly shaped to accommodate the race cages 46, 48 and 50 and correspondingly contained pluralities of spring loaded rollers 82a–82n and solid rollers 84a–84n and 86a–86n. Track 40 is now described. An arced surface 132 having a radius R-2 similar and equal to the radius R-2 of FIGS. 7 and 8 (i.e., the radius of the inner circumference 130 of the outer tube 14) is flanked on each side by planar surfaces 134 and 136. The same relationship of R-2 to R-1 (of each tapered and arced surface) as previously described in connection with FIGS. 7 and 8 exists where the smaller radius (R-1) of the tapered and arced surface provides for tangential and intimate contact with a larger radius surface having a larger radius R-2. Planar surfaces 134 and 136 slidingly accommodate the rear surface 88 of the race cage 46. The profiles of the spring loaded rollers 82a–82n and solid rollers 84a–84n and 86a–86n extend inwardly beyond the cavities 96 of the race cages 46, 48 and 50 whereby the spring loaded rollers 82a–82n and the solid rollers 84a–84n and 86a–86n tangentially and rollingly contact the arced surface(s) 132 of the configured inner tube 16 in a manner previously described and as illustrated in FIG. 10.

Figure 10:
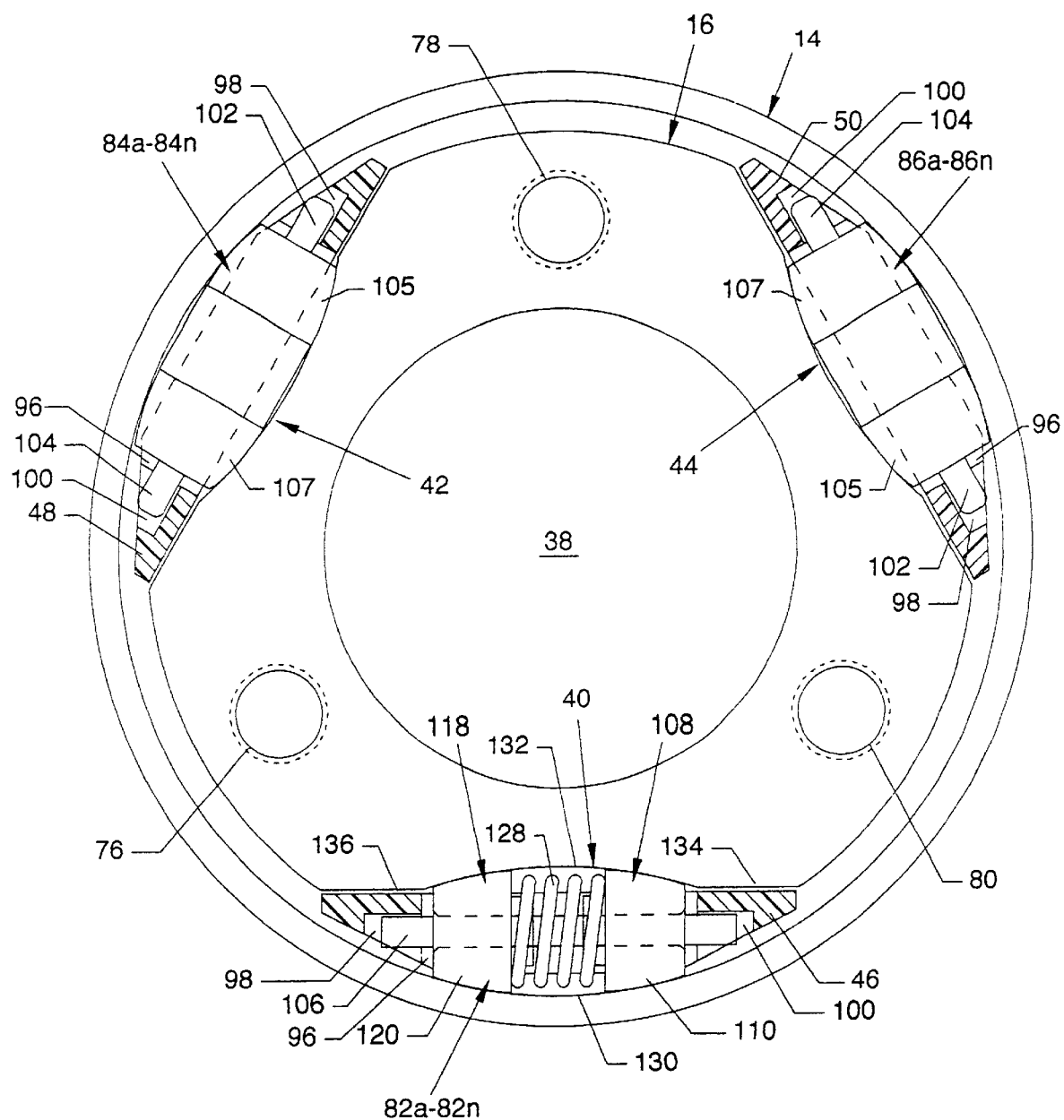
FIG. 10 illustrates a top view in partial cross section of the race cages containing pluralities of spring loaded rollers and solid rollers in accommodational alignment between the configured inner tube and an outer tube.

FIG. 10 illustrates a top view in partial cross section of the race cages 46, 48 and 50 correspondingly containing pluralities of spring loaded rollers 82a–82n and solid rollers 84a–84n and 86a–86n in accommodational alignment between the configured inner tube 16 and the outer tube 14, where all numerals mentioned before correspond to those elements previously described. Spring 128 forces the right roller segment 108 and the left roller segment 118 outwardly along the axle 106 in opposing directions to bring the tapered and arced surfaces 110 and 120 to bear at different points on and along the tapered and arced surfaces 110 and 120 against the inner circumference 130 of the outer tube 14 and against the arced surface 132 of the configured inner tube 16, the force of which depends on the loading of spring 128. Outward and lateral oppositional movement of the right roller segment 108 and the left roller segment 118 provides for constantly applied and intimate contact of all roller type components including the spring loaded rollers 82a–82n, the solid rollers 84a–84n and the solid rollers 86a–86n with the inner circumference 130 of the inner tube 14 in that outwardly forced positioning of the right roller segment 108 and the left roller segment 118 provides for forcing of the spring loaded rollers 82a–82n inwardly toward the center of the linear motion assembly 12, thereby causing forced intimate contact of the solid rollers 84a–84n and the solid rollers 86a–86n with the inner circumference 130 of the outer tube 14. Six multiple tangential points of forced and spring loaded contact of the spring loaded rollers 82a–82n, the solid rollers 84a–84n and the solid rollers 86a–86n with the inner circumference 130 of the outer tube 14 provides for exceptional resistance to torquing about the vertical axis of the outer tube 14 with reference to the configured inner tube 16 without the need for additional vertical slotted guidance devices. Solid rollers 82a–82n, 86a–86n and the spring loaded rollers 82a–82 are automatically self-aligning between the arced surface 132 of the configured inner tube 16 and the inner circumference 130 of the outer tube 14, each having common sized radii. Misalignment between the common sized radii causes repositioning of the rollers toward the area of least resistance between the arced surface 132 and the inner circumference 130. Spring forces provided by the spring loaded rollers 82a–82n provide force which promotes repositioning of the rollers to the position of least resistance resulting in perpendicular alignment of the rollers to radials of the linear motion assembly 12.

The spring loaded rollers 82a–82n and solid rollers 84a–84n and 86a–86n are aligned in triangulated fashion and spaced at 120° from each other having points of tangential contact spaced a small number of degrees from each 120° radial. In the alternative, upward re-sizing of the rollers 82a–84n, 84a–84n and 86a–86n and downward dimensions of the configured inner tube 16 could offer points of tangential contact spaced at 60° increments to provide points of tangential contact of uniform spacing about the inner circumference of the outer tube 14 to provide stability utilizing wide and evenly spaced tangential contact.

MODE OF OPERATION

Figure 11:
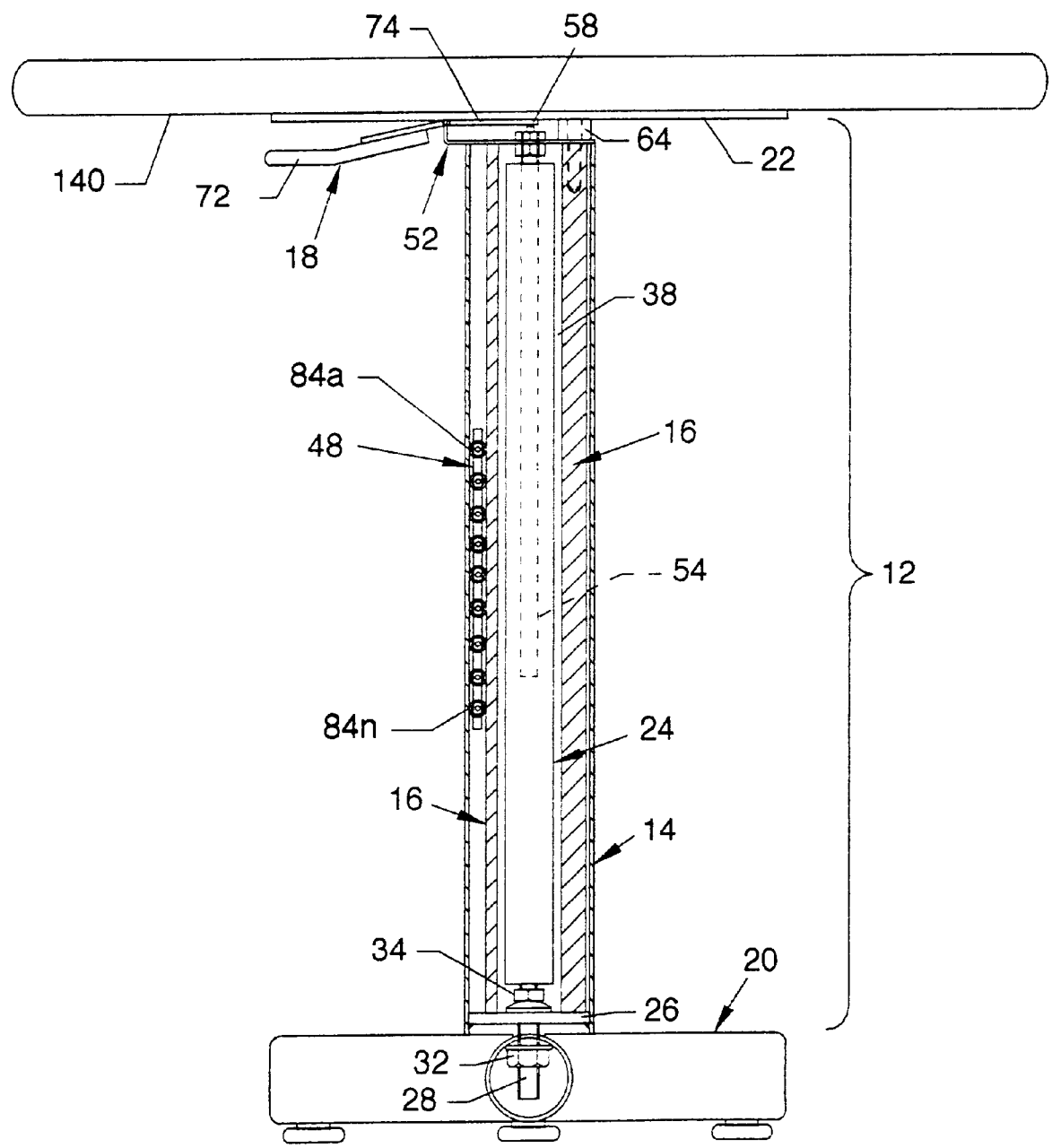
FIG. 11 illustrates, in sectional view, the mode of operation of the linear motion table leg in the minimum height position along the linear motion assembly including a table top thereupon.
Figure 12:
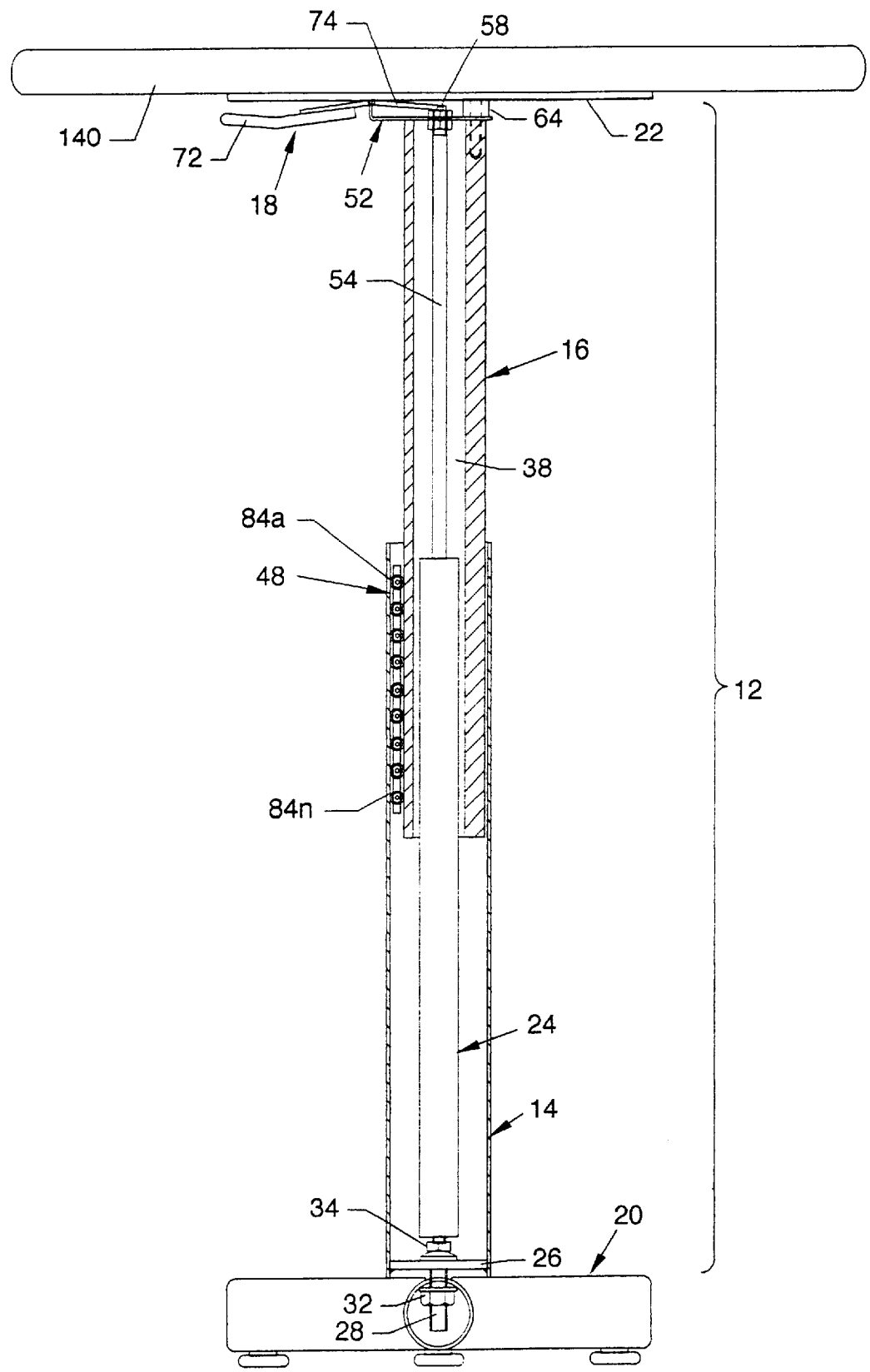
FIG. 12 illustrates, in sectional view, the mode of operation of the linear motion table leg in maximum height position along the linear motion assembly including a table top thereupon.

FIGS. 11 and 12 illustrate, in sectional view, the mode of operation of the linear motion table leg 10 along the linear motion assembly 12 including a table top 140 thereupon, where all numerals mentioned before correspond to those elements previously described. FIG. 11 illustrates the linear motion table leg 10 in the minimum height position and FIG. 12 illustrates the linear motion table leg 10 in the maximum height position. Of course, any intermediate position can be utilized between the minimum height position and the maximum height position shown. With reference to FIG. 11, the minimum height position, movement of the handle 72 of the actuation assembly 18 causes the pivot plate 74 to pivot about the pivot mounting plate 52 to operate the operating valve pin 58 at the top of the gas spring 24 allowing the gas spring 24 to bypass its internal locking devices and to thus urge the operator rod 54 upwardly to raise the table top 140 by extension of the configured inner tube 16 and to thus lengthen the linear motion assembly 12. Upward movement, such as provided for by the gas spring 24 of the table top 140, causes upward linear motion of the configured inner tube 16 within and along the interior of the outer tube 14. As viewed in FIG. 11 it can be seen that initially the race cages 46, 48 and 50 correspondingly containing pluralities of spring loaded rollers 82a–82n and solid rollers 84a–84n and 86a–86n, such as represented by the race cage 48 and the solid rollers 84a–84n, are positioned at a suitable distance vertically between the upper and lower regions of the outer tube 14. As the configured inner tube 16 advances in an upward direction, the spring loaded rollers 82a–82n and the solid rollers 84a–84n and 86a–86n, which are rollingly engaged between the inner circumference 130 of the outer tube 14 and the arced surfaces 132 of the configured inner tube 16, are rotated about their respective axles 102, 104 and 106 and rollingly repositioned in an upward direction at an upward rate less than that of the upwardly advancing configured inner tube 16 until reaching a position at or near the top of the outer tube 14 at a point where the configured inner tube 16 has reached a maximum height, as shown in FIG. 12, as allowed by the limitations of the gas spring 24. Upon reaching an intermediate height or the maximum height along the extended length of the linear motion assembly 12, the handle 72 of the actuation assembly 18 is released to lock the gas spring 24 at the desired position via internal locking schemes internal to the gas spring 24. Although a gas spring 24 is described and illustrated, other devices, such as manual head screws, cable assemblies, electric linear actuators or other suitable devices can be incorporated to provide for vertical positioning and stopping means of the configured inner tube 16, and the use of a gas tube shall not be construed to be limiting to the scope of the invention. Multiple vertical points of tangential contact by the vertically extending and aligned arrays of spring loaded rollers 82a–82n and solid rollers 84a–84n and 86a–86n as contained in the race cages 46, 48 and 50 provides for ample triangulated support at a sufficient distance vertically along and about the regions of multiple contacts of the spring loaded rollers 82a–82n and the solid rollers 84a–84n and 86a–86n between the outer tube 14 and the configured inner tube 16 to allow smooth and even operation of the configured inner tube 16 within the outer tube 14 even if the table top 140 is unevenly loaded, such as by having a heavy weight situated on one edge. The relationship of the vertical height of the arrays of rollers to the diameter of the configured inner tube 16 and outer tube 14 combination in combination with the force provided by the spring loaded rollers 82a–82n is such that straight and true linear motion is provided without any side load wobble during the extension or in an extended position.

Figure 13:
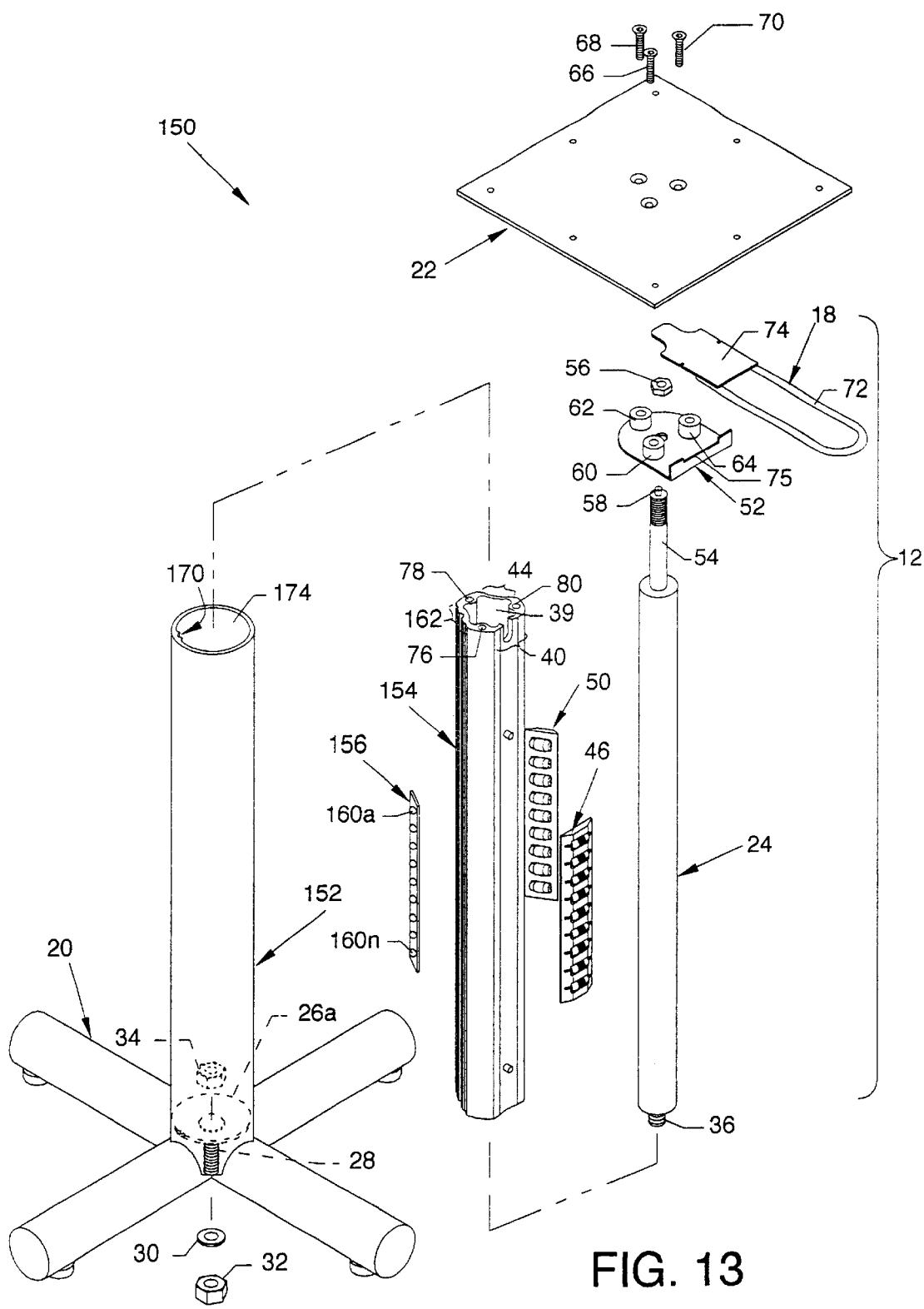
FIG. 13 an alternate embodiment, illustrates an exploded isometric view of a linear motion table leg.

FIG. 13, an alternate embodiment, illustrates an exploded isometric view of a linear motion table leg 150 incorporating the majority of the components of the linear motion table leg 10 and modified and configured to include anti-rotational structure, where all numerals mentioned before correspond to those elements previously described. In the embodiment, outer tube 14 is modified or replaced by an outer tube 152 having many like designated components, attributes and structural features of the outer tube 14, configured inner tube 16 is modified or replaced by a configured inner tube 154 having many like designated components, attributes and structural features of the configured inner tube 16, and race cage 48 containing an array of solid rollers 84a–84n is replaced by a race cage 156 containing an array of ball bearings 160a–160n. The mounting plate 26 of the previously shown outer tube 14 is replaced by a mounting plate 26a having a reference tab extending therefrom to engage the bearing race 170 described in FIG. 14. The bore 38, central to the configured inner tube 16, now is replaced by a sculpted continuous interior space 39 for economy of material. The exterior surfaces of the configured inner tube 154 and the adjacent components, except for the configured track 162, are similar to the exterior surfaces of the configured inner tube 16 and components adjacent thereto and provide the same function as previously described.

Figure 14:
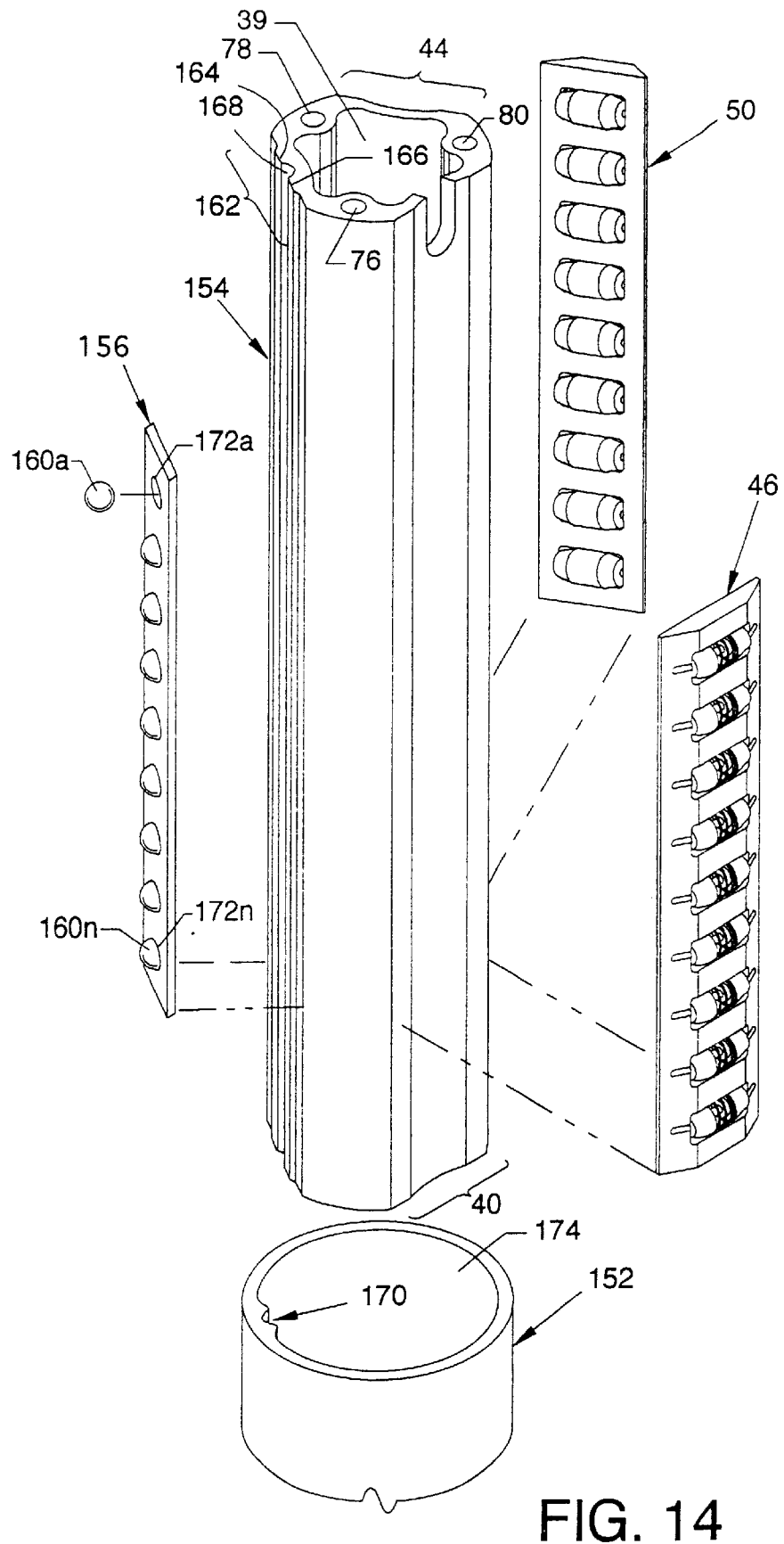
FIG. 14 illustrates a detail of the alternate embodiment, showing in particular the alignment and relationship of the configured inner tube to the outer tube and the alignment and relationship of a race cage containing ball bearings to the configured inner tube; and, FIG. 15 illustrates a top view in partial cross section of the alternate embodiment showing the race cages containing ball bearings, spring loaded rollers and solid rollers disposed between the configured inner tube and the outer tube.

FIG. 14 illustrates the alignment and relationship of the configured inner tube 154 to the outer tube 152, as well as the race cage 156, to a configured track 162 occupying the region specified in previous figures designated as track 42. The configured track 162 includes vertically oriented planar surfaces 164 and 166 flanking a vertically oriented substantially curved bearing race 168 disposed therebetween. The inner surface of the outer tube 152 includes a vertically oriented substantially curved bearing race 170 corresponding to the bearing race 168 on the exterior of the configured inner tube 154. The race cage 156 includes a plurality of spaced capture holes 172a–172n for accommodating capture and spacing of the ball bearings 160a–160n. The ball bearings in the race cage 156 mutually engage the bearing race 168 in the configured inner tube 154 and the bearing race 170 on the interior of the outer tube 152, as illustrated in FIG. 15.

Figure 15:
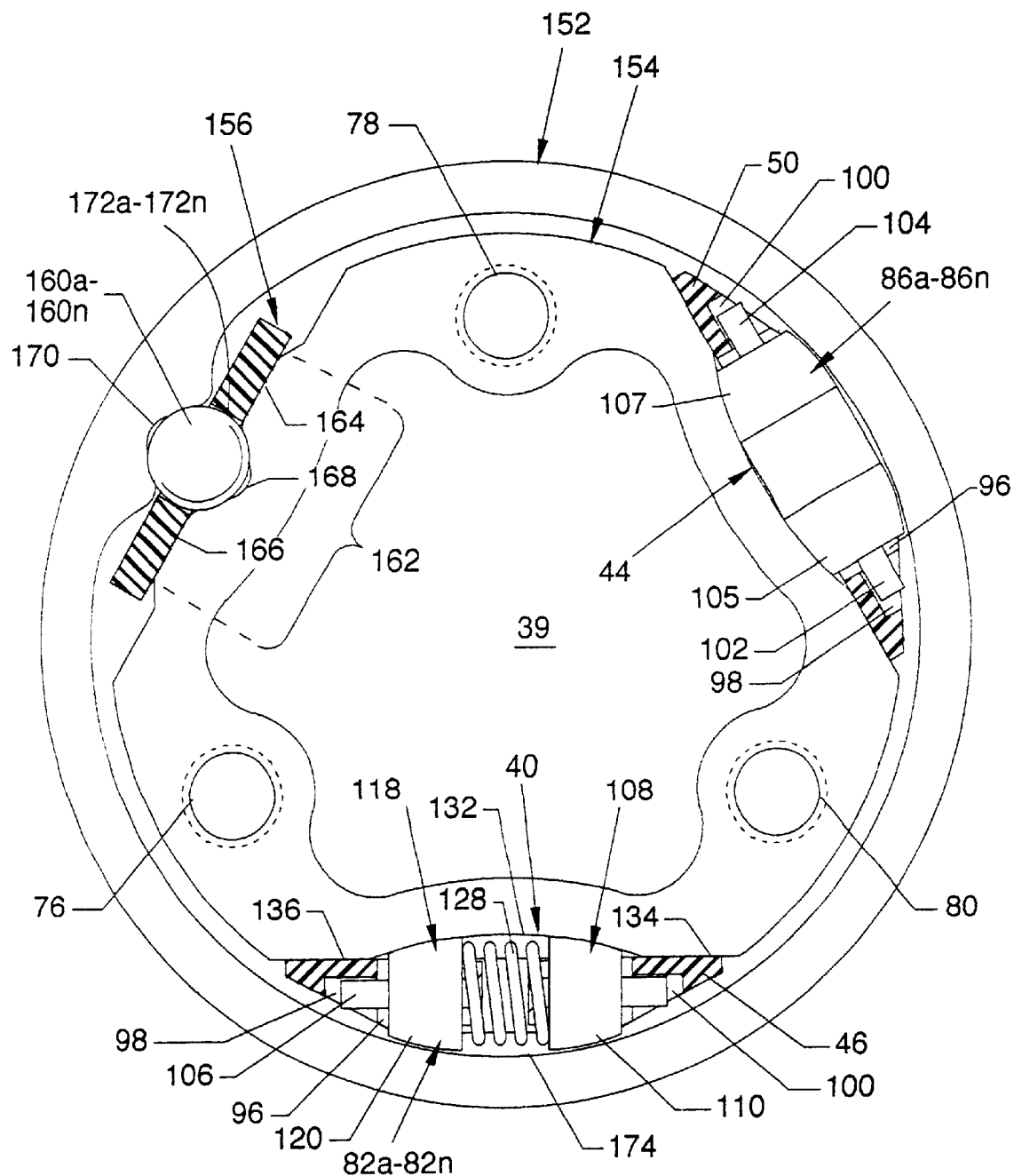

FIG. 15 illustrates a top view in partial cross section of the race cages 46, 50 and 156 correspondingly containing pluralities of spring loaded rollers 82a–82n, solid rollers 86a–86n and ball bearings 160a–160n in accommodational alignment between the configured inner tube 154 and the outer tube 152, where all numerals mentioned before correspond to those elements previously described. Spring 128 forces the right roller segment 108 and the left roller segment 118 outwardly along the axle 106 in opposing directions to bring the tapered and arced surfaces 110 and 120 to bear at different points on and along the tapered and arced surfaces 110 and 120 against an inner arced surface 174, which corresponds to the inner circumference 130 previously described, of the outer tube 152 and against the arced surface 132 of the configured inner tube 154, the force of which depends on the loading of spring 128. Outward and lateral oppositional movement of the right roller segment 108 and the left roller segment 118 provides for constantly applied and intimate contact of all roller type components including the spring loaded rollers 82a–82n and the solid rollers 86a–86n with the inner arced surface 174 of the outer tube 152 in that outwardly forced positioning of the right roller segment 108 and the left roller segment 118 provides for forcing of the spring loaded rollers 82a–82n inwardly toward the center of the linear motion assembly 12, thereby causing forced intimate contact of the solid rollers 86a–86n with the inner arced surface 174 of the outer tube 152. The race cage 156 containing the ball bearings 160a–160n aligns to the planar surfaces 164 and 166 of the configured inner tube 154 and the ball bearings 160a–160n align within the curved walls of the bearing race 168 located on the configured inner tube 154. The ball bearings 160a–160n also align at their opposite side to the curved walls of the bearing race 170 located on the inner arced surface 174 of the outer tube 152. Such location and capture of the ball bearings 160a–160n in the bearing races 168 and 170 locks and references the configured inner tube 154 to the outer tube 152 in a positive fashion with respect to rotation and such location acts as a dynamic keyway during vertical operation. The ball bearings 160a–160n are free to rotate in the bearing races during vertical positioning of the configured inner tube 154 within the outer tube 152 while still providing referencing of the configured inner tube 154 to the outer tube 152. Capture of the ball bearings 160a–160n by the opposing bearing races 168 and 170 in combination with four multiple tangential points of forced and spring loaded contact of the spring loaded rollers 82a–82n and the solid rollers 86a–86n with the inner arced surface 174 of the outer tube 152 provides for exceptional resistance to rotational torquing about the vertical axis of the outer tube 152 with reference to the configured inner tube 154. The spring loaded rollers 82a–82n are automatically self-aligning between the arced surface 132 of the configured inner tube 154 and the inner arced surface 174 of the outer tube 154, each having common sized radii. Misalignment between the common sized radii causes repositioning of the rollers toward the area of least resistance between the arced surface 132 and the inner arced surface 174 of the outer tube 152. Spring forces provided by the spring loaded rollers 82a–82n provide force which promotes repositioning of the rollers to the position of least resistance resulting in perpendicular alignment of the rollers to radials of the linear motion assembly 12.

The spring loaded rollers 82a–82n and solid rollers 86a–86n and the ball bearings 160a–160n are aligned in triangulated fashion and spaced at 120° from each other having points of capture or of tangential contact, respectively, spaced a small number of degrees from each 120° radial. In the alternative, upward re-sizing of the ball bearings 160a–160n, the rollers 82a–84n and 86a–86n and downward dimensions of the configured inner tube 154 could offer points of capture or tangential contact spaced at 60° increments to provide points of capture or tangential contact of uniform spacing about the inner arced surface 174 of the outer tube 152 to provide stability utilizing wide and evenly spaced tangential contact.

Various modifications can be made to the present invention without departing from the apparent scope hereof.

LINEAR MOTION TABLE LEG

PARTS LIST

| | |
|---|---|
| 10 | linear motion table leg |
| 12 | linear motion assembly |
| 14 | outer tube |
| 16 | configured inner tube |
| 18 | actuation assembly |
| 20 | base |
| 22 | mounting plate |
| 24 | gas spring |
| 26a | mounting plate |
| 26 | mounting plate |
| 28 | bolt |
| 30 | washer |
| 32 | nut |
| 34 | nut |
| 36 | threaded shaft |
| 38 | bore |
| 39 | sculpted continuous interior space |
| 40 | track |
| 42 | track |
| 44 | track |
| 46 | race cage |
| 48 | race cage |
| 50 | race cage |
| 52 | pivot mounting plate |
| 54 | operator rod |
| 56 | nut |
| 58 | operating valve pin |
| 60 | standoff |
| 62 | standoff |
| 64 | standoff |
| 66 | screw |
| 68 | screw |
| 70 | screw |
| 72 | handle |
| 74 | pivot plate |
| 74a | tab |
| 75 | cutout |
| 76 | threaded hole |
| 78 | threaded hole |
| 80 | threaded hole |
| 82a–n | spring loaded rollers |
| 84a–n | solid rollers |
| 86a–n | solid rollers |
| 88 | rear surface |
| 90 | front surface |
| 92 | chamfered surface |
| 94 | chamfered surface |
| 96 | cavities |
| 98 | groove |
| 100 | groove |
| 102 | axle |
| 104 | axle |
| 105 | tapered and arced surface |
| 106 | axle |
| 107 | tapered and arced surface |
| 108 | right roller segment |
| 110 | tapered and arced surface |
| 112 | annular planar surface |
| 114 | annular shoulder |
| 116 | bore |
| 118 | left roller segment |
| 120 | tapered and arced surface |

-continued

LINEAR MOTION TABLE LEG

PARTS LIST

| 122 | annular planar surface |
| 124 | annular shoulder |
| 126 | bore |
| 128 | spring |
| 130 | inner circumference |
| 132 | arced surface |
| 134 | planar surface |
| 136 | planar surface |
| 140 | table top |
| 150 | linear motion table leg |
| 152 | outer tube |
| 154 | configured inner tube |
| 156 | race cage |
| 160a–n | ball bearings |
| 162 | configured track |
| 164 | planar surface |
| 166 | planar surface |
| 168 | bearing race |
| 170 | bearing race |
| 172a–n | capture holes |
| 174 | arced surface |

What is claimed is:

1. A linear motion system comprising:
    a. a first elongated member, said first elongated member being tubular and having an inner cylindrical circumferential surface;
    b. a second elongated member, said second elongated member having an outer circumferential surface and being positioned concentrically within said first elongated member;
    c. a plurality of roller and race cage assemblies, each roller and race cage assembly including a race cage and a set of rollers contained by the race cage, each roller and race cage assembly being positioned between said first and second elongated members with each roller of the set of rollers thereof being in rolling engagement with said inner cylindrical circumferential surface and with said outer circumferential surface such that said second elongated member is rollingly displaceable linearly with respect to said first elongated member; and,
    d. wherein each of the rollers of one of said sets of rollers is a spring loaded roller composed of two opposed segments and a spring between the two opposed segments, and wherein each of the rollers of all of the other sets of rollers is a solid roller of one-piece construction.

2. The linear motion system as defined in claim 1, wherein said outer circumferential surface of said second elongated member includes tracks corresponding in number to the number of roller and race cage assemblies, and wherein each track has a roller and race cage assembly aligned therewith.

3. The linear motion system as defined in claim 2, wherein each track extends longitudinally along the full length of said second elongated member.

4. The linear motion system as defined in claim 2, wherein each track comprises a concave arcuate surface flanked by planar sufaces.

5. The linear motion system as defined in claim 4, wherein each race cage includes a planar rear surface which bears against said planar surfaces of the respective track with which it is aligned.

6. The linear motion system as defined in claim 5, wherein each roller of each of said sets of rollers is in rolling engagement with said concave arcuate surfaces of said tracks.

7. The linear motion system as defined in claim 1, wherein the rollers of one of the sets of rollers having solid rollers of one-piece construction are ball bearings.

8. The linear motion system as defined in claim 1, wherein said roller and race cage assemblies are spaced at equal intervals around said outer circumferential surface of said second elongated member.

9. The linear motion system as defined in claim 8, wherein the number of roller and race cage assemblies is three.

10. The linear motion system as defined in claim 1, wherein said inner cylindrical circumferential surface of said first elongated member is circular.

11. The linear motion system as defined in claim 1, wherein said inner cylindrical circumferential surface of said first elongated member includes a straight longitudinally extending track having a concave arcuate surface against which the rollers of one set of rollers are in rolling engagement.

12. A linear motion system comprising:
    a. an outer tube having an inner circumferential surface;
    b. an inner tube positioned concentrically within said outer tube, said inner tube having an outer circumferential surface provided with a number of straight longitudinally extending tracks spaced at equal intervals thereabout, each of said tracks including a concave arcuate surface portion; and,
    c. race cages corresponding in number to the number of tracks, each race cage being aligned with a respective one of said tracks and each race cage containing a plurality of rollers in rolling engagement with said inner circumferential surface of said outer tube and with the concave arcuate surface portion of the track on the outer circumferential surface of the inner tube with which it is aligned, whereby said inner tube is rollingly displaceable linearly with respect to said outer tube.

13. The linear motion system as defined in claim 12, wherein the number of tracks is three and the number of race cages is three.

14. The linear motion system as defined in claim 13, wherein the rollers of two of said three race cages are solid rollers of one-piece construction, and the rollers of the third of said race cages are spring loaded rollers formed of two opposed segments and a spring located between the two opposed segments.

15. The linear motion system as defined in claim 14, wherein the rollers of one of the two race cages having solid rollers of one-piece construction are ball bearings.

16. The linear motion system as defined in claim 12, wherein each track extends along the full length of said inner tube.

17. The linear motion system as defined in claim 12, wherein each track further includes planar surfaces flanking its concave arcuate surface portion.

18. The linear motion system as defined in claim 17, wherein each race cage includes a planar rear surface which bears against said planar surfaces of the respective track with which it is aligned.

19. The linear motion system as defined in claim 12, wherein said inner circumferential surface of said outer tube is circular.

20. The linear motion system as defined in claim 12, wherein said inner circumferential surface of said outer tube includes a straight longitudinally extending track having a concave arcuate surface which matches, faces, and aligns with the concave arcuate surface portion of one of said tracks on the outer circumferential surface of said inner tube, and wherein the rollers which are in rolling engagement with said one of said tracks on the outer circumferential surface of said inner tube are also in rolling engagement with said concave arcuate surface of said track on the inner circumferential surface of said outer tube.

21. A linear motion system comprising:
   a. an outer tube having an inner circumferential surface;
   b. an inner tube positioned concentrically within said outer tube, said inner tube having an outer circumferential surface provided with three straight longitudinally extending tracks spaced at equal intervals thereabout, each track including a concave arcuate surface portion;
   c. three race cages each containing a plurality of rollers, each of said three race cages being aligned with a respective one of said three tracks with the rollers thereof being in rolling engagement with the concave arcuate surface portion of the respective track and with said inner circumferential surface of said outer tube, whereby said inner tube is rollingly displaceable linearly with respect to said outer tube; and,
   d. each of said plurality of rollers of two of said three race cages being solid rollers of one-piece construction, and each of said plurality of rollers of the third of said three race cages being spring loaded rollers formed of two opposed segments and a coil spring located between the two opposed segments.

22. The linear motion system as defined in claim 21, wherein each of said three tracks further includes planar surfaces flanking the concave arcuate surface portion thereof.

23. The linear motion system as defined in claim 22, wherein each of said three race cages includes a planar rear surface which bears against said planar surfaces of a respective track.

24. The linear motion system as defined in claim 21, and further including a gas spring located within said inner tube.

25. The linear motion assembly as defined in claim 21, wherein each of said outer and inner tubes has an upper end and a lower end, and further comprising a base attached to the lower end of said outer tube and a mounting plate attached to the upper end of said inner tube.

26. The linear motion assembly as defined in claim 25, and further comprising a gas spring located within said inner tube, said gas spring having a first end connected to said base and a second end connected to said mounting plate.

27. The linear motion assembly as defined in claim 26, wherein said gas spring includes an operator rod, a valve, and a pin for operating said valve, and wherein there is further included an actuation assembly for engaging said pin to operate said valve.

28. The linear motion system as defined in claim 21, wherein said inner circumferential surface is circular.

29. The linear motion system as defined in claim 21, wherein the solid rollers of one-piece construction of one of the two race cages having solid rollers of one-piece construction are ball bearings.

30. The linear notion system as defined in claim 29, wherein said inner circumferential surface of said outer tube has a straight longitudinally extending track having a concave arcuate surface against which said ball bearings roll.

31. A linear motion system comprising:
   a. an outer tube having an inner circumferential surface provided with a straight longitudinally extending track having a concave arcuate surface;
   b. an inner tube positioned concentrically within said outer tube, said inner tube having an outer circumferential surface provided with three straight longitudinally extending tracks spaced at equal intervals thereabout, one of said three tracks including a concave arcuate surface portion matching and facing said concave arcuate surface of said track on the inner circumferential surface of said outer tube, and the other two of said three tracks each including a concave arcuate surface portion;
   c. three race cages each containing a plurality of rollers, each of said three race cages being aligned with a respective one of said three tracks provided on said outer circumferential surface of said inner tube, each of the plurality of rollers of one of said three race cages being in rolling engagement with the concave arcuate surface of the track provided on the inner circumferential surface of the outer tube and with the matching and facing concave arcuate track surface portion on the outer circumferential surface of the inner tube, and each of the plurality of rollers of the other two of the three race cages being in rolling engagement with said inner circumferential surface of said outer tube and with a respective one of the concave arcuate surface portions of said other two of said three tracks on said outer circumferential surface of said inner tube, whereby said inner tube is rollingly displaceable linearly with respect to said outer tube; and,
   d. each of said plurality of rollers of said one of said three race cages being ball bearings, each of said plurality of rollers of another of said three race cages being solid rollers of one-piece construction, and each of said plurality of rollers of the third of said three race cages being spring loaded rollers formed of two opposed segments and a spring located between the two opposed segments.

32. The linear motion system as defined in claim 31, wherein each of said three tracks provided on said outer circumferential surface of said inner tube further includes planar surfaces flanking the concave arcuate surface portion thereof.

33. The linear motion system as defined in claim 32, wherein each of said three race cages includes a planar rear surface which bears against said planar surfaces of a respective track.

34. The linear motion system as defined in claim 31, and further including a gas spring located within said inner tube.

35. The linear motion assembly as defined in claim 31, wherein each of said outer and inner tubes has an upper end and a lower end, and further comprising a base attached to the lower end of said outer tube and a mounting plate attached to the upper end of said inner tube.

36. The linear motion assembly as defined in claim 35, and further comprising a gas spring located within said inner tube, said gas spring having a first end connected to said base and a second end connected to said mounting plate.

37. The linear motion assembly as defined in claim 36, wherein said gas spring includes an operator rod, a valve, and a pin for operating said valve, and wherein there is further provided an actuation assembly for engaging said pin to operate said valve.

* * * * *